United States Patent
Funatsu et al.

(10) Patent No.: US 6,833,214 B2
(45) Date of Patent: Dec. 21, 2004

(54) MULTIPLE UNEVEN PLATE AND SEPARATOR USING MULTIPLE UNEVEN PLATE

(75) Inventors: Jun Funatsu, deceased, late of Toyota (JP); by Tomomi Funatsu, legal representative, Toyota (JP); Kouichi Ikushima, Toyota (JP); Kouji Shimoda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 10/184,921

(22) Filed: Jul. 1, 2002

(65) Prior Publication Data

US 2002/0168562 A1 Nov. 14, 2002

Related U.S. Application Data

(62) Division of application No. 09/365,907, filed on Aug. 3, 1999, now Pat. No. 6,490,778.

(30) Foreign Application Priority Data

Aug. 3, 1998 (JP) ............................................ 10-219471
May 21, 1999 (JP) ............................................ 11-142332

(51) Int. Cl.$^7$ .............................. H01M 8/02; H01M 8/04
(52) U.S. Cl. .............................. 429/39; 429/26; 429/38
(58) Field of Search .............................. 429/26, 34, 38, 429/39

(56) References Cited

U.S. PATENT DOCUMENTS

| | | |
|---|---|---|
| 2,928,638 A | 3/1960 | Parker |
| 3,343,397 A | 9/1967 | Fournier et al. |
| 3,351,441 A | 11/1967 | Gewiss |
| 3,376,684 A | 4/1968 | Cole et al. |
| 3,701,271 A | 10/1972 | Kendall, Jr. |
| 3,861,339 A | 1/1975 | Aida et al. |
| 3,887,101 A | 6/1975 | Adachi |
| 3,910,085 A | 10/1975 | Biddell et al. |
| 3,961,929 A | 6/1976 | Stockdale |
| 4,071,942 A | 2/1978 | Kowallik |
| 4,072,034 A | 2/1978 | Dawson et al. |
| 4,109,503 A | 8/1978 | Francon et al. |
| 4,220,031 A | 9/1980 | Naslund |
| 4,241,146 A | 12/1980 | Sivachenko et al. |
| 4,289,007 A | 9/1981 | Kraft |
| 4,317,350 A | 3/1982 | Sivachenko et al. |
| 4,380,573 A | 4/1983 | Naslund |
| 4,434,638 A | 3/1984 | Sivachenko |
| 4,646,554 A | 3/1987 | Wallis et al. |
| 4,698,992 A | 10/1987 | Bernet |
| 4,895,428 A | 1/1990 | Nelson et al. |
| 4,897,206 A | 1/1990 | Castelli |
| 5,338,320 A | 8/1994 | Fukuda et al. |

(List continued on next page.)

FOREIGN PATENT DOCUMENTS

| | | | |
|---|---|---|---|
| GB | 1162655 | | 8/1969 |
| JP | 6 1147904 | | 7/1986 |
| JP | 6 2110261 | | 5/1987 |
| JP | 63-058768 | * | 3/1988 |
| JP | 63-058769 | * | 3/1988 |
| JP | 1-197969 | | 8/1989 |
| JP | 04-110135 U | | 9/1992 |
| JP | 07-153472 | | 6/1995 |
| JP | 08-222237 | | 8/1996 |

*Primary Examiner*—Jonathan S. Crepeau
(74) *Attorney, Agent, or Firm*—Kenyon & Kenyon

(57) ABSTRACT

A method of manufacturing a multiple uneven plate having multiple uneven portions, the multiple uneven portions having large protruding degree of each of the concave or convex portions, the concave or convex portions adjacent to one another includes the steps of forming a plurality of grooves, so that in the grooves the plate thickness is reduced and bending the plate to form a plurality of crest and trough lines crossing the grooves.

5 Claims, 13 Drawing Sheets

U.S. PATENT DOCUMENTS

| | | |
|---|---|---|
| 5,501,094 A | 3/1996 | Mizuta et al. |
| 5,881,858 A | 3/1999 | Tsukamoto et al. |
| 5,918,497 A | 7/1999 | Mieda |
| 5,953,951 A | 9/1999 | Fujimoto et al. |
| 6,021,559 A | 2/2000 | Smith |
| 6,139,974 A | 10/2000 | Atkinson et al. |
| 6,253,442 B1 | 7/2001 | Benson et al. |
| 6,317,960 B1 | 11/2001 | Kragle |
| 2003/0064278 A1 * | 4/2003 | Matsukawa .................. 429/38 |

* cited by examiner

COINING GROOVE RESTRICTING REGION

MULTIPLE UNEVEN PLATE AND SEPARATOR USING MULTIPLE UNEVEN PLATE

This application is a divisional application of U.S. Application Ser. No. 09/365,907, filed Aug. 3, 1999, which is now U.S. Pat. No. 6,490,778.

INCORPORATION BY REFERENCE

The disclosure of Japanese Patent Application No. HEI 10-219471 filed on Aug. 3, 1998 and HEI 11-1423332 filed on May 21, 1999 including the specification, drawings and abstract is incorporated herein by reference in their entirety.

BACKGROUND OF THE INVENTION

1. Field of the Invention

The present invention relates to a method of manufacturing a multiple uneven plate having an overall plate shape, provided with multiple uneven portions by forming a plurality of concave or convex portions on at least one surface of the plate, and further relates to the multiple uneven plate and a fuel cell separator using the multiple uneven plate.

2. Description of the Related Art

Materials having an overall plate shape and provided with multiple protrusions (convex portions) on one or both of the surfaces thereof as well as depressed portions (concave portions) formed following the formation of the protrusions, i.e., multiple uneven plates, have been put to practical use in various fields. Multiple uneven plates of this type have various purposes or functions. It is possible to increase strength by, for instance, providing a plurality of convex portions and concave portions on, for example, a plate member and by thereby increasing a geometric moment of inertia. Also, convex and concave portions are provided for the purpose of increasing the entire surface area of a plate member. Furthermore, convex portions may function as contact points with other members or supports therefor.

In any case, it is necessary to provide the convex and concave portions integrally with the flat plate member which serves as a base member. For that reason, multiple uneven plate manufacturing methods are based on deformation of a plate member (such as a metal plate) in a direction of a thickness of the plate by pressing. In addition, if different functions are required for the convex portions and the flat plate member (base member), they may be made of different materials. In that case, therefore, axial or pin-like members which become convex portions, are joined to the flat plate member while the members are kept in a vertical state. As a method of manufacturing a multiple uneven plate having convex portions and a plate member made of a different material, there is proposed, for example, a method of joining members for convex portions to the flat plate member by welding or bonding. There is also proposed a method of integrating convex portions with a base member by inserting members for convex portions into holes formed in a flat plate member and then squelching the convex members (by so-called caulking).

Manufacturing the above-stated multiple uneven plate by partially deforming a metal plate to form a plurality of convex and concave portions, may cause the material to be elongated or fluidized. Even with metallic materials having excellent ductility, elongation and fluidization are limited. Due to this, in many cases, the height of a convex portion to be formed or the depth of a concave portion is limited to about 1.5 times the thickness of the material, with the result that necessary uneven shapes cannot be manufactured. To solve this problem, there is proposed a method of repeated ironing of the material. With this method, however, the number of working steps increases and productivity deteriorates. Besides, the application of this method is disadvantageously limited to a case where material can be sufficiently supplied to the convex and concave portions to be formed.

Moreover, when manufacturing a multiple uneven plate having multiple convex and concave portions formed adjacent to one another, the quantity of material used to form the convex and concave portions is limited. Thus, the height of the convex portions and the depth of the concave portions is limited, as well. Normally, the ratio of diameter and pitch of uneven (convex and concave) portions must be set at 2.5 or more. In this respect, the shape of the multiple uneven plate is disadvantageously limited.

In contrast, if the method of manufacturing a multiple uneven plate by joining a plurality of members for convex portions to a flat plate member is adopted, the material is not deformed and, therefore, there is no limit to the shape. However, if members are joined by means of welding, the material is molten. Due to this, if convex portions are as small, e.g. several millimeters in diameter, and the pitches. thereof are narrow, it is quite likely that the members for the convex portions will be molten and lost. If an adhesive agent is used, by contrast, it is not only difficult to ensure conductivity between the convex portions and the flat plate member, it is also difficult to ensure sufficient joint strength and durability.

If the convex portions are joined to the flat plate member by means of caulking instead of the above two means, it is required to form holes through which the convex members are inserted into the flat plate member. This disadvantageously increases the number of working steps. Besides, the inner diameter of a hole should be larger than an outer diameter of a convex member so as to facilitate insertion of the convex member into the hole. The clearance between the hole and the convex member should then be tightly sealed by caulking the convex member. With caulking, it is possible to form the convex members integrally with the plate member; however, it is difficult to ensure an airtight seal. For these reasons, it is difficult to adopt caulking to the manufacture of various multiple uneven plates.

As stated above, the-manufacture of a multiple uneven plate has disadvantages in that working limitations hamper increases in the heights of convex portions and the depths of concave portions or must widen their intervals and limit the shape of the multiple uneven plates. Furthermore, to solve these disadvantages, other disadvantages, such as the number of working steps may increase, reliability may deteriorate, product cost may increase and quality may deteriorate.

SUMMARY OF THE INVENTION

Under these circumstances, the present invention has been made. It is, therefore, an object of the present invention to provide a method of manufacturing a multiple uneven plate and a fuel cell separator using the multiple uneven plate which dispense with limitations of shapes of convex and concave portions and pitches and which have high productivity.

To obtain the above object, the present invention in a first embodiment is a method of manufacturing a multiple uneven plate having a plurality of mutually independent uneven portions formed on front and back surfaces thereof, the method comprising the step of forming a plurality of grooves on at least one surface of a plate member, a thickness of the plate member at each of the grooves being reduced relative to a thickness of the plate member outside the grooves and bending the plate member to form a plurality of trough lines and crest lines, the trough and crest lines being oriented to cross the grooves.

With this method, it is possible to reduce "elongation degree" and "stretching degree" of the material and to form a plurality of mutually independent uneven portions mainly by bending. Thus, it is possible to manufacture a multiple uneven plate including uneven portions each having a large height or depth and adjacent to one another.

The present invention in a second embodiment is a method of manufacturing a multiple uneven plate to include a plurality of concave portions formed on one surface thereof, the method comprising the steps of placing the plate member on a die and vibrating and pressing a punch against one surface of the plate member in at least one of a thickness direction of the plate member and a plane direction of the plate member.

With this method, while the elongation of material occurs to part of the uneven portions, the overall uneven portions are gradually finished into a predetermined shape. Thus, creeps hardly occur. As a result, it is possible to form uneven portions each having a depth larger than the plate thickness.

The present invention in a third embodiment is a method of manufacturing a multiple uneven plate having a plurality of convex portions provided on one surface thereof, the method comprising the steps of placing the plate member on a die and pressing a plurality of axial members against at least one surface of the plate member and pressurizing each of the axial members in axial direction thereof and fitting each of the axial members into the plate member to thereby integrate the axial members with the plate member.

With this method, the punches serve as the axial members which are protruding members and the axial members are fitted and integrated into the plate member. Thus, it is possible to easily manufacture the multiple uneven plate. In addition, the material for the plate member is not fluidized or elongated. It is, therefore, possible to put the respective protrusions close to one another and to lengthen the protrusions. As a result, it is possible to obtain a multiple uneven plate having many protrusions per unit area and having protruding degrees. It is also possible to change the material of the plate member and that of the protrusions (axial members), if necessary.

The present invention in a fourth embodiment is a method of manufacturing a multiple uneven plate including a plurality of concave portions depressed from one surface of a plate member toward the other surface of the plate member, the method comprising the steps of causing deformations accompanied by fluidization of the plate member to one portion of the plate member, to be provided with the concave portions, for each of a plurality of regions divided to include a plurality of concave portions, to thereby form the concave portions.

With this method, while the concave portions are formed by causing material fluidization in the plate member, the working is executed in one portion of divisions determined in advance. Due to this, material is not introduced from the same portions at a plurality of worked portions. This makes it possible to advance the formation limit and to form concave portions or convex portions each having a larger depth than the plate thickness. Besides, the working is executed simultaneously in a plurality of divisions, so that there is not fear of the deterioration of productivity.

The present invention in a fifth embodiment is a fuel cell separator comprising a multiple uneven plate, the multiple uneven plate having a plurality of first grooves formed in a first surface thereof, a thickness of the plate being smaller in each first groove than a thickness of the plate outside the first grooves, the plate being bent to form a plurality of second grooves, the second grooves forming a corresponding plurality of trough and crest lines, the trough and crest lines crossing the first grooves. With this structure, the convex portions determined by the first and second grooves become contact points electrically continuous to the electrodes of the fuel cell, and these grooves can be used as channels for gas and coolant.

According to this embodiment, the grooves formed on the first surface form cooling water channels and the grooves formed on the second surface form gas channels. Due to this, it is possible to form gas channels and cooling water channels using a single separator or a pair of separators.

Preferably, upstream side first grooves in a flow direction of cooling water may differ from downstream side first grooves in array or shape. By doing so, the flow rate of cooling water distributed into the second grooves through the first channels can be controlled by the shape or array of the first grooves. Also, it is possible to sufficiently secure the quantity of cooling water for each of the second grooves to thereby prevent occurrence of cooling defect.

Moreover, the separator may include a plurality of third grooves formed on the second surface thereof by bending the plate in portions corresponding to crest lines on the first surface of the plate member to cross the crest lines, wherein the first grooves and second grooves on the first surface form cooling water channels, and the second grooves and the third grooves on the second surface form gas channels. By doing so, it is possible to use one of the surfaces of the plate member as a cooling part through which cooling water flows and the other surface thereof as a gas supply and discharge part for gas supplied for powering the fuel cell. Besides, the grooves are formed to cross one another on each of the surfaces. This makes it possible to accelerate the distribution of cooling water and gas.

In addition to the above constitution, it is possible to form fourth grooves having a larger cross sectional area than a cross sectional area of the third grooves, the fourth grooves being formed on the second surface of the plate by pressure-deforming predetermined portions of the plate corresponding to crest lines on the second surfaces of the plate member in a plate thickness direction.

By so forming, the fourth groove having a larger cross-sectional area than that of the third grooves are formed as grooves for communicating with the second grooves formed by bending in the gas supply part on the second surface of the plate member. Due to this, it is possible to introduce liquid such as droplet in the gas channels into the fourth grooves, or to distribute the liquid to other second grooves through the fourth grooves. As a result, it is possible to get rid of the clogging of the second grooves due to droplet and to realize good gas flow and distribution.

The present invention in sixth embodiment is a method of manufacturing a separator, the method comprising the steps of forming a plurality of first parallel grooves on a plate member by first work method and forming a plurality of second parallel grooves being oriented to cross the first grooves on the plate member by second method different from the first work method.

DESCRIPTION OF THE PREFERRED EMBODIMENTS

The present invention will be described concretely with reference to the accompanying drawings.

Figure 1:
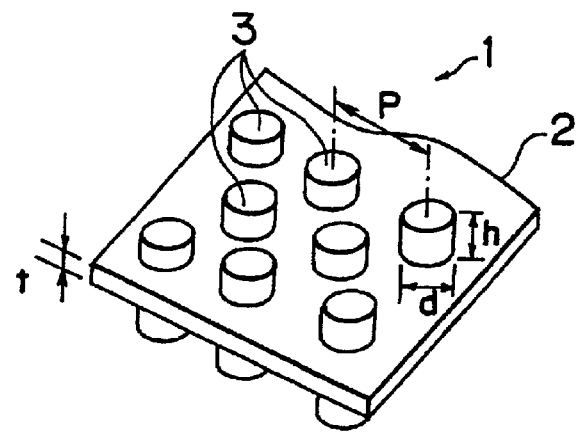
FIG. 1 is a perspective view showing part of a multiple uneven plate formed by the present invention.

FIG. 1 shows an example of a multiple uneven plate 1 manufactured by the present invention. A lot of convex portions 3 arranged to be spaced apart from one another are provided on both surfaces of a flat plate member 2 which serves as a base member. The plate member 2 and the convex portions 3 may be made of either the same metallic material or different metallic material. In addition, a finished product shows that the convex portions 3 and the plate member 2 are completely integrated with one another, they are originally different elements. The product is made by tight fitting elements forming the convex portions 3 into an element forming the plate member 2.

Now, dimensional relationship among the respective parts of the multiple uneven plate 1 will be described. The height h of the convex portion 3 is set at 1.5 times as large as the plate thickness t of the flat plate member 2. The outer diameter d of the convex portion 3 is set to be larger than a pitch P between the convex portions 3. For instance, if the plate thickness t is 0.3 mm, the height of the convex portion h is 0.6 mm, the pitch between the convex portions 3 is 1.0 mm and the outer diameter of the convex portion is smaller than 1.0 mm.

Figure 2A:
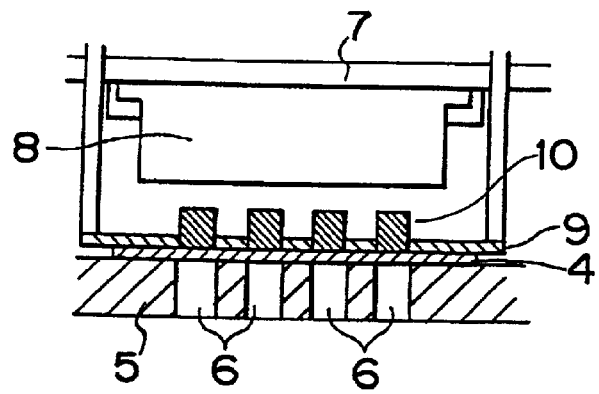
FIGS. 2A and 2B are side views showing the manufacturing process of the multiple uneven plate shown in FIG. 1.
Figure 2B:
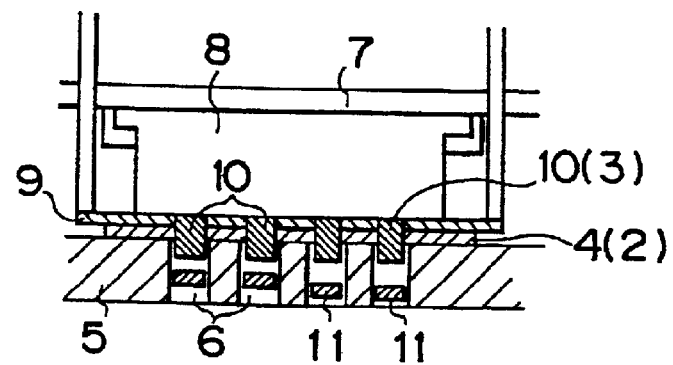

Next, description will be given to a method of manufacturing the multiple uneven plate 1 shown in FIG. 1 according to the present invention. FIGS. 2A and 2B typically show the manufacturing process. In this case, blanking tools are used. Namely, formed holes 6 each having an inner diameter slightly larger than the outer diameter d of each convex portion 3 are arranged spaced apart from one another on a die 5, on which a thin sheet 4 as the material of the flat plate member 2 is mounted, at the same pitch as pitch P of the convex portions 3. A punch 8 fixed onto the lower surface of a press ram 7, is arranged above the die 5 so that the punch 8 vertically moves integrally with the press ram 7. Also, a blank holder 9, which vertically moves independently of the press ram 7 and the punch 8, is arranged between the punch 8 and the die 5. The blank holder 9 is provided with a plurality of through holes having the same dimensions and same pitch as those of the formed holes in the die 5 so as to be consistent with the formed holes 6, respectively. The blank holder 9 is intended to specify the lower limit position of the punch 7 and the thickness of the blank holder 9 is set to be the same as the height h of the convex portion 3.

In this method, first, the thin sheet 4 is placed on the die 5 while the punch 8 and the blank holder 9 are sufficiently raised. Next, the blank holder 9 is lowered and forced downward, thereby fixing the thin sheet 4 onto the die 5. Thereafter, elements for convex portions 3, i.e., billet-like pieces 10 are arranged upright in the through holes formed in the blank holder 9, respectively. The billet-like pieces 10 become the convex portions 3. Thus, each billet-like pieces 10 is set to have a length equal to or slightly larger than (2×h+t), twofold of the height h of the convex portion 3 plus the plate thickness t. It is noted that the blank holder 9 may be lowered after the billet-like pieces 10 are arranged on the thin sheet 4 if the pieces 10 can be erected right on the formed holes 6 in the die 5. FIG. 2A shows a state in which the billet-like pieces 10 are arranged upright on the thin sheet 4 fixed onto the die 5 by the blank holder 9.

If the punch 8 is lowered by the press ram 7 from the state shown in FIG. 2A, the billet-like pieces 10 are pressed against the thin sheet 4 axially (vertical direction in FIG. 2A). As a result, the thin sheet 4 is partially blanked by the billet-like pieces 10. Then, scraps 11 are peeled off downward of the die 5. The punch 8 abuts on the upper surface of the blank holder 9 and stops descending. Thereafter, the punch 8 ascends together with the press ram 7. Since the thickness of the blank holder 9 is set to be equal to the height h of the convex portion 3 as described above, the billet-like pieces 10 are pushed into the thin sheet 4 until the protruding height becomes equal to the height of the convex portion 3 (which state is shown in FIG. 2B).

If the billet-like pieces 10 pushed into the thin sheet 4 are pressed axially by the punch 8 as stated above, the pieces 10 are deformed to widen their central portions. On the other hand, the diameter of a hole blanked by each of the billet-like pieces 10 is equal to that of the tip end portion of the billet-like piece 10. Due to this, the relatively wide diameter portion of the intermediate part of the billet-like piece 10 is forcedly pushed and fitted into the relatively narrow diameter hole. As a result, the billet-like pieces 10 are dispersed while tight attached to the thin sheet 4 and integrated with the thin sheet 4. A stress is generated in the through holes of the thin sheet 4 blanked by the billet-like pieces 10 so as to narrow the inner diameters of the through holes by an elastic force inherent to the material, i.e., a springback. The billet-like pieces 10 are tightened by the elastic force of the through hole portions and integrated with the thin sheet 4, that is, the plate member 2.

In other words, according to the above method, if the billet-like pieces 10 forming the convex portions 3 blank the thin sheet 4, the pieces 10 (i.e., convex portions 3) are integrated with the thin sheet 4, that is, the plate member 2. Owing to this, no particular joint means and steps are required. Good air-tightness can be ensured between the convex portions 3 and the plate member 2.

Figure 3:
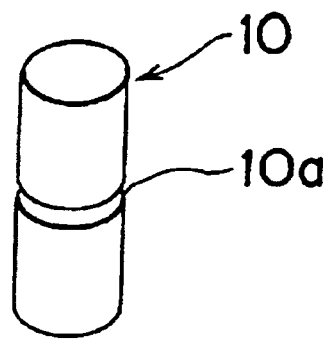
FIG. 3 is a perspective view of a billet-like piece used for the multiple uneven plate.

As can be seen from the above, the convex portions 3 are integrated with the plate member 2 by interaction between them. To make the interaction for integrating them more strongly and more surely, it is preferable to increase the surface roughness of the outer periphery of the billet piece 10. For instance, the surface roughness is preferably equal to or higher than 25S according to the Japanese Industrial Standard (JIS). In addition, so as to ensure that the convex portions 3 are engaged with and integrated with the plate member 2, a band-like groove 10a as shown in FIG. 3 may be formed on the outer periphery of the central part of the billet-like piece 10. The depth of the belt-like groove 10a is preferably equal to or smaller than the degree of the springback of the through hole formed in the thin sheet 4 by the billet-like piece 10.

Figure 4:
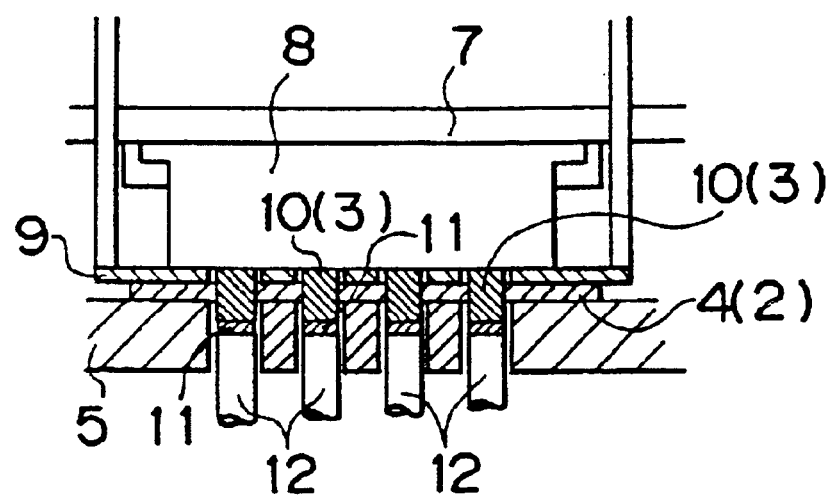
FIG. 4 is a side view showing a case of compressing billet-like pieces by means of knockouts.

The above-stated method is to fix the convex portions 3 by the tightening force of the flat plate member 2. Thus, as the outer diameter of the intermediate portion of the billet-like piece 10 is relatively larger than the inner diameter of the through hole formed in the thin sheet 4, the fixing force for fixing the convex portions and the plate member 4 increases. Now, a method of surely and strongly fixing the convex portions 3 to the flat plate member 2 will be described with reference to FIG. 4. In this method, axially movable knockouts 12 are provided in the formed holes 6 in the die 5, respectively. The knockouts 12 and the punch 7 axially press the billet-like pieces 10. As a result, the billet-like pieces 10 are deformed such that each axial length is shortened and the outer diameter of the intermediate portion is increased accordingly. Following the deformation, the through holes formed in the thin sheet 4 are widened. Thus, stress applied to the through holes, that is, the load of tightening the billet-like pieces 10 increases and the convex portions 3 are integrated with the plate member 2 more strongly, thereby further ensuring air-tightness between them.

Figure 5A:
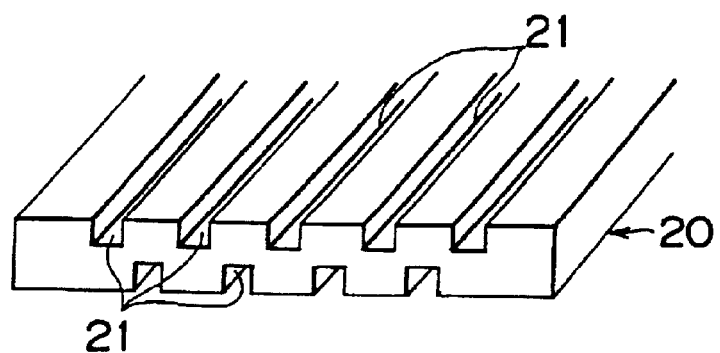
FIGS. 5A and 5B are explanatory views for the process of manufacturing a multiple uneven plate by wave bending.

The above description concerns the multiple uneven plate consisting of two types of members (convex portions 3 and plate member 2). The multiple uneven plate may consist of a single flat plate member, which will be described hereinafter. First, a plurality of parallel grooves 21 are formed on both surfaces of a flat plate member 20 (comprised of metal such as aluminum or an alloy) shown in FIG. 5A. These grooves 21 are formed not by bending the plate member 20 but by the fluidization or removal of the material such as coining or cutting. The thickness of the plate at a portion of the groove 21 is smaller than that of the original plate (plate prior to working). As shown in FIG. 5A, the grooves 21 on the front surface of the plate member 20 are shifted from the grooves 21 on the back surface thereof by a half pitch in the direction crossing the longitudinal direction of the grooves 21 (horizontal direction in FIG. 5A). The dimensions of the plate member 20 are, for example, 0.3 mm in plate thickness, 0.15 mm in the width and depth of the groove 21.

In case of forming grooves 21 by coining, the depth of the groove 21 is preferably 50% or less of the plate thickness. The reason is to maintain the service life of a mold used in coining and to restrict the quantity of the material removed by coining and raised between grooves 21. If the quantity of the material raised between the grooves 21 increases, work-hardening occurs to the raised portions and cracks may possibly occur during wave bending which will be described later. If annealing is conducted after forming the grooves 21 by coining or other similar working using material fluidization, the grooves 21 may be formed to have a thickness of 50% or more of the plate thickness.

Figure 5B:
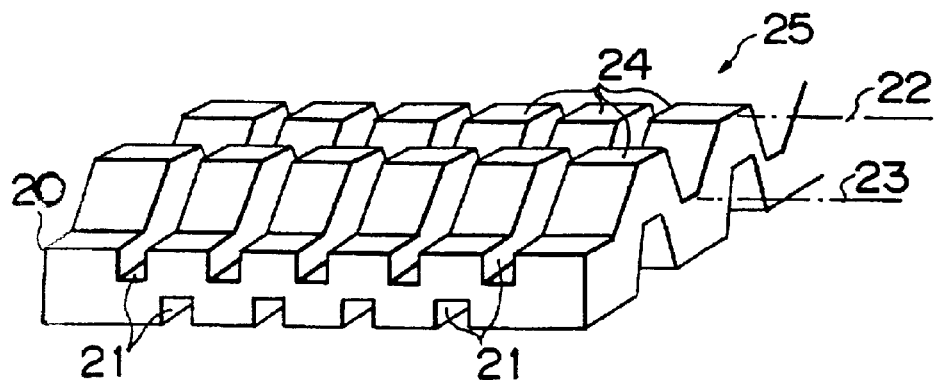

Next, wave bending is conducted to the plate member 20 shown in FIG. 5A and the shape shown in FIG. 5B is formed. Wave bending is to bend a member such that it has a cross section having crests and troughs provided alternately and continuously in one direction and that crest lines 22 or trough lines 23 cross the grooves 21. The height of the resultant crest or the depth of the resultant trough, that is, the dimension between the peak of the crest and the bottom of the trough is 1.5 times or more as large as the thickness of the plate member 20.

Since the crests thus formed have a wave bending direction crossing the grooves 21, they are separated from one another by the grooves 21 remaining after working. Also, the separated crests become convex portions 24. As described above, the grooves 21 are formed on both the front and back surfaces of the plate member 20. Since the front surface and the back surface have the same bending state, the convex portions 24 are formed on both the front and back surfaces of the plate member 20 in the same manner. It is noted that the convex portions 24 on the front surface are shifted from the convex portions 24 on the back surface by a half pitch.

The multiple uneven plate 25 thus manufactured has convex portions 24 each having a height or corresponding concave portions each having a depth of 1.5 times or more of the flat plate thickness. The pitch of the concave portions 24 or convex portions in the direction along the grooves 21 (depth direction in FIG. 5A) can be freely set by the pitch for wave bending. In addition, the pitch in the direction crossing the grooves 21 (horizontal direction in FIG. 5A) can be set at that of the grooves 21, that is, set to be smaller than the largest outer dimension of the convex portion 24.

In FIG. 5B, the peak of the convex portion 24 is formed flat. This flat shape can be obtained by forming a flat surface on a working mold in wave bending. In addition, although edges are clearly obtained by groove working and wave bending in FIGS. 5A and 5B which are typical views, edge portions and bent portions are curved in actual working.

Figure 6A:
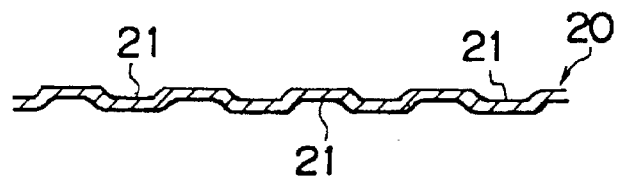
FIGS. 6A and 6B are cross-sectional views of grooves.
Figure 6B:
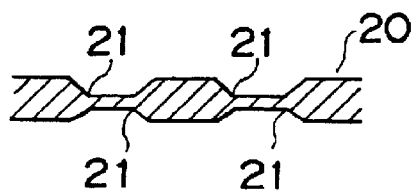
Figure 7:
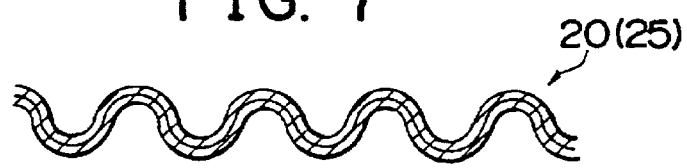
FIG. 7 is a cross-sectional view of a wave-bent shape.

Further, the grooves 21 may be formed as shown in FIGS. 6A and 6B. FIG. 6A is a cross-sectional view showing that the grooves 21 on the front surface of the plate member 20 are formed to be shifted by a half pitch from those on the back surface thereof. FIG. 6B is a cross-sectional view showing that the grooves 21 on the front surface of the plate member 20 are formed in the same positions as those of the grooves 21 on the back surface thereof in width direction. The shape formed by wave bending may have a cross section of continuous circular arcs as shown in FIG. 7. The grooves 21 may be formed not on both surfaces but on one-sided surface of the plate member 20. In this case, the thickness of the plate having a groove may be smaller than that before working. Even if the grooves 21 formed on one of the surfaces of the plate member 20 are subjected to wave bending as mentioned above, the strongest tensile force acts on the tip end portions of the crests on thick portions other than those having grooves. As a result, material fluidizes at the tip end portions of the crests and shallow grooves are formed to cross the crest lines. Thus, the continuous crests formed by working are separated from one another by grooves generated at the peaks of the crests in crossing direction to thereby form a lot of convex portions. Thus, according to the method of forming grooves on only one of the both surfaces of the plate member, only one of upper and lower dies may be provided with protrusions for forming grooves. This follows that only one of the upper and lower molds is worn, so that mold cost can be reduced.

Figure 8:
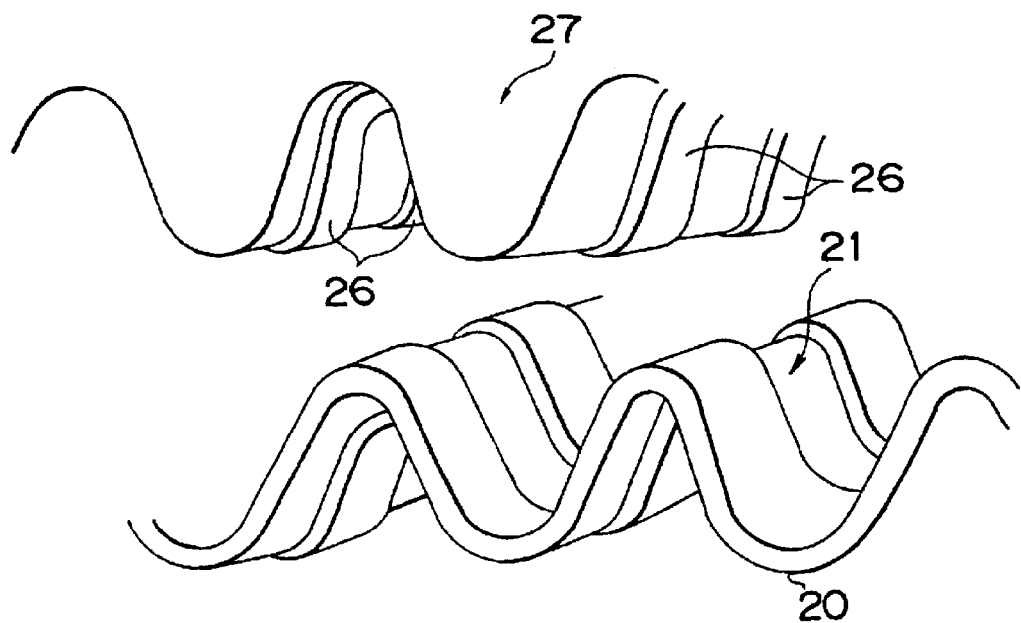
FIG. 8 is a typical view showing a mold having protrusions to form grooves.

If the grooves 21 are formed on only one surface of the plate member 20, it is preferable that the peak portions of the crests on the other surface correspond to the grooves on one surface. Additionally, in case of working the plate member 20 having grooves 21 formed in advance, there is a possibility that stress is complexly applied to the plate member 20 in surface direction to deform the shapes of the grooves 21. In that case, it is desirable that a mold having protrusions 26 fitted into the grooves 21 formed in advance is used as shown in FIG. 8. The protrusions 26 may be either continuous as shown in FIG. 8 or formed portions corresponding to the peaks of crests and those corresponding to bottoms of troughs in wave bending. It is noted that these protrusions 26 are intended to form groove portions for separating crests to be formed into the convex portions 24, into desired shapes. Therefore, there is no need to fit tightly the protrusions 26 into the grooves 21 formed in advance. These protrusions 26 may be formed on the work surface of each of or either of the punch 27 and a die (not shown) which form the die.

The example shown in FIGS. 5 through 8 shows a method of manufacturing a multiple uneven plate by both working grooves 21 by fluidization or removal of material and bending the material. By comparison, a method of forming either convex or concave portions only by fluidization of material will be described hereinafter.

Figure 9:
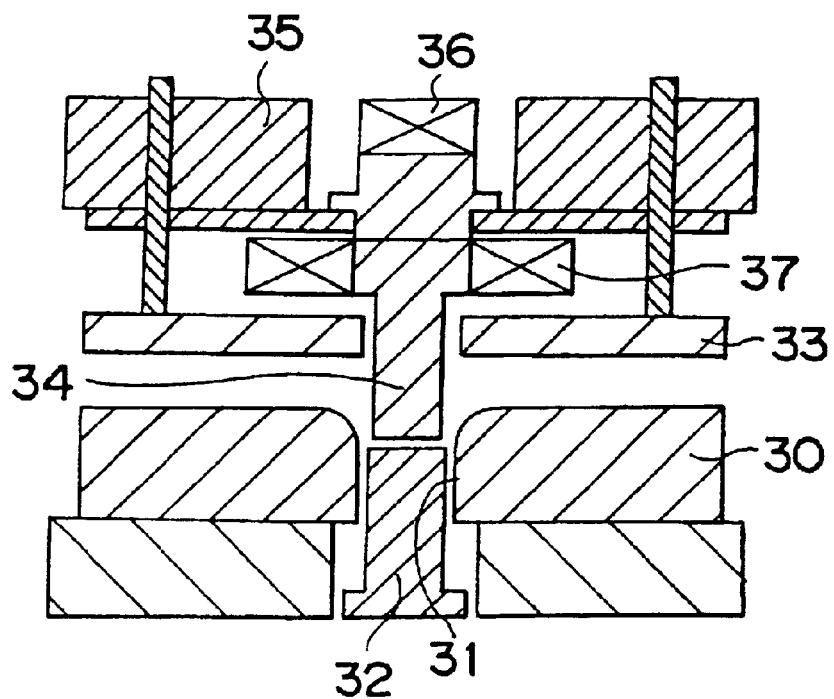
FIG. 9 is a typical view of an apparatus for drawing a convex portion by axially or radially vibrating a punch.

The method shown hereinafter is intended to form concave or convex portions on a plate member as a material by applying vibration to a punch which directly presses the plate member in axial direction and the direction perpendicular to the axial direction (radial direction). First, a working apparatus used for this method will be described. FIG. 9 is a typically cross-sectional view showing an example of the working apparatus. A die 30 on which a plate member is mounted is provided with a formed hole 31 for determining the outer dimensional shape of a convex portion or a concave portion. A knockout 32, which vertically moves, is provided in the hole 31. A vertically movable blank holder 33 provided with a through hole having a central axis common to that of the formed hole 31 is arranged above the die 30.

Further, a punch 34 is provided to penetrate the blank holder 33 and face the knockout 32. The punch 34 is disposed right under a press ram 35. The punch 34 is provided with a vertical vibrator 36 vibrating the punch axially (vertically) and a horizontal vibrator 37 vibrating the punch 34 radially (horizontally).

Figure 10:
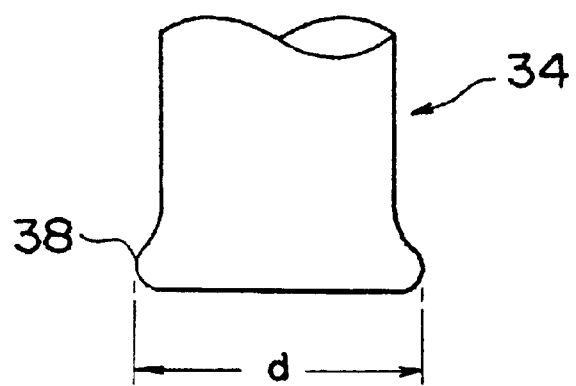
FIG. 10 shows a shape of the tip end portion of the punch.

A land 38, radially protruding as shown in FIG. 10, is formed on the tip end portion of the punch 34 to be vibrated radially to press the plate member serving as material. The outline of the punch 34 is such that the diameter of the portion on which the land 38 is formed is the largest. The outer diameter d of the portion of the land 38 is set smaller than the inner diameter D of a concave portion to be formed by a degree corresponding to the amplitude of the radial vibration. The punch 34 may be vibrated equally in all radial directions and have a central position fixed radially. Also, the punch 34 may be held eccentric to the center of the concave portion to be formed and revolved about the center.

Figure 11:
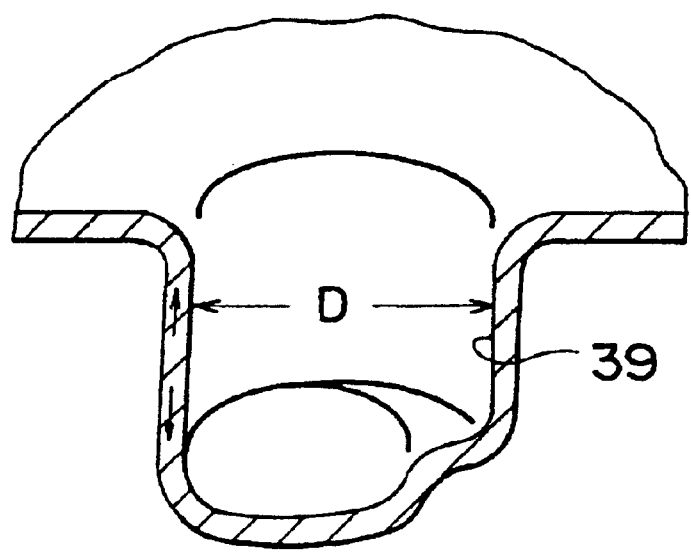
FIG. 11 is a perspective cross-sectional view showing a process of forming a convex portion.

If a multiple uneven plate is manufactured using the apparatus shown in FIG. 9, a plate member (not shown) as material is placed on the die 30 while the blank holder 33 and the punch 34 are sufficiently raised. In this state, the blank holder 33 is lowered and forced downward to thereby fix the plate member onto the die 30. Next, the punch 34 is descended to press against the plate member. Since the punch 34 is vibrated axially and radially by the respective vibrators 36 and 37, concave portions are gradually formed on the plate member by the axial vibration of the punch 34. In addition, the inner diameters of the concave portions are widened in accordance with the amplitude of the radial vibration of the punch 34. FIG. 11 shows one example of concave portions 39 formed as described above. Part of the plate member applied with load by the vibration of the punch 34 is "elongated" in the direction indicated by an arrow in FIG. 11 and the depth and outer diameter of the concave portion 39 are gradually increased. It is noted that the outer diameter of the punch 34 is set smaller than the inner diameter of the concave portion 39. Due to this, the punch 34 is revolved about the center of the concave portion 39 to thereby sequentially work the inner peripheral surface of the concave portion 39.

Figure 12:
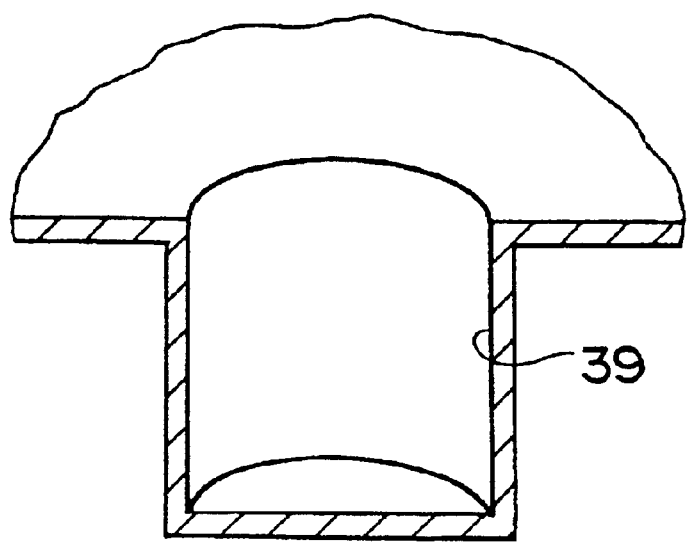
FIG. 12 is a perspective cross-sectional view showing the shape of the convex portion.

As can be understood from the above, the elongation of the material greatly differs from that of the conventional drawing. That is, according to the above method, as indicated by the arrow in FIG. 11, part of the material or concave portion 39 is elongated and the elongated portion is gradually moved to finally form the entire concave portion 39 into a predetermined shape. According to the conventional method in which the punch is linearly and axially moved and a concave portion is formed by one step, by contrast, material elongation occurs throughout the concave portion simultaneously. Due to this, according to the conventional method, creeps tend to occur and the inner diameter and depth of the concave portion are limited. According to the above method of the present invention, creeps hardly occur, thereby improving the limitation of forming such as the inner diameter and depth of the concave portion 39. Further, since the area of the punch 34 which contacts with the material is reduced, it is possible to lengthen the useful life of a mold. Moreover, according to the above method, the entire shape of the concave portion 39 is finished while the material is partly deformed. Due to this, it is possible to form the concave portion 39 having a cross section closer to a rectangle as shown in FIG. 12 by reducing the radius of curvature of each corner of the concave portion 39.

If a concave portion or a convex portion is formed by elongating material and the material is introduced from the surrounding of a worked portion, it is possible to increase the dimensions of the respective parts of the concave or convex portion according to the quantity of the introduced material. That is, the formation limit is advanced. However, if concave or convex portions to be formed are adjacent to one another, it is required to introduce material at formation portions, respectively and material may run short at the boundaries of these formed portions. As a result, the shape of the concave or convex portions may be limited. The following method according to the present invention is intended to manufacture a multiple uneven plate by eliminating these limitations.

Figure 13:
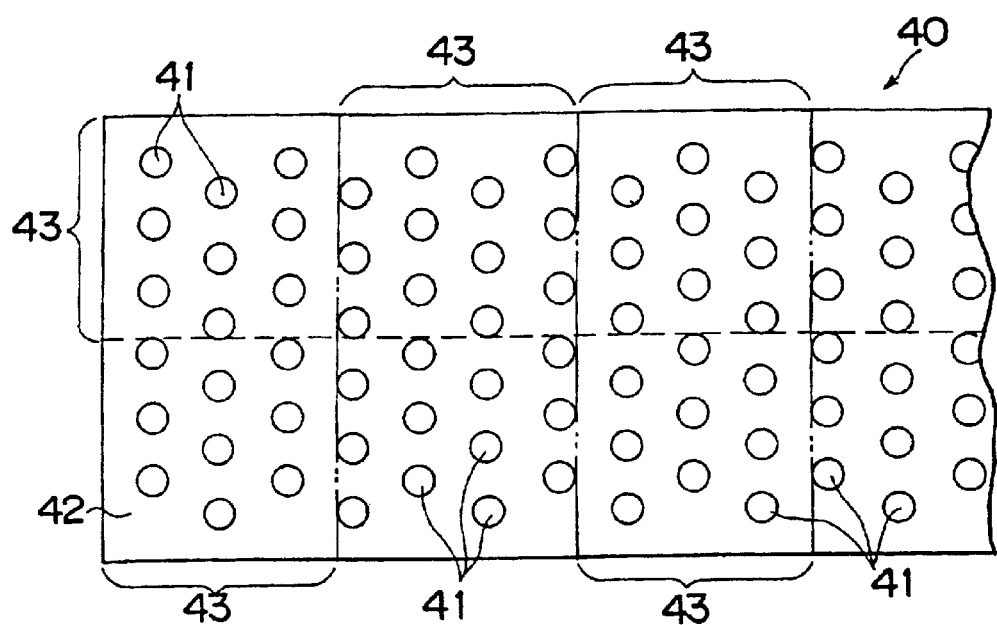
FIG. 13 is a plan view showing an array of a plurality of divisions for drawing convex portions in units of divisions.

A multiple uneven plate 40 to be manufacture by this method is provided by working a lot of concave or convex portions adjacent to one another (to be generally referred to as 'uneven portions' hereinafter) 41 on a plate member 42, as shown in FIG. 13. These uneven portions 41 are formed by drawing (or stretching) the plate member 42 and the drawing is conducted in units of divisions 43.

Figure 14:
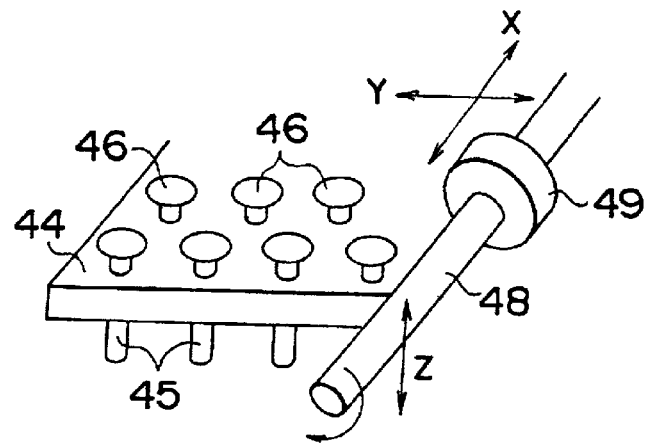
FIG. 14 is a schematically perspective view showing the constitution of a punch used for forming convex portions in units of divisions.
Figure 15:
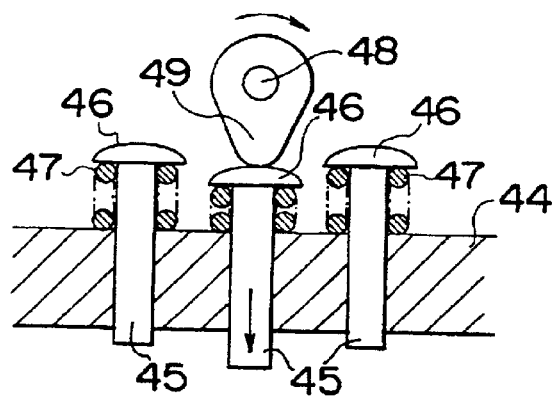
FIG. 15 is a cross-sectional view showing a state in which the punch shown in FIG. 14 is pushed down.

FIGS. 14 and 15 show the structure of a punch for drawing. Many punches 45 each having an outer diameter and a pitch equal to the inner diameter and pitch of an uneven portion 41 to be formed, are vertically penetrated into and held by a plate-like punch holder 44. Each of these punches 45 is provided with a head portion 46 having a large outer diameter and a convex circular arc at an upper end thereof as shown in FIG. 15. An elastic member 47, such as a coil spring, is provided between the head portion 46 and the upper surface of the punch holder 44, to thereby hold each of the punches 45 in an upper limit position.

A rotary shaft 48, moved in plane direction (horizontal direction; X and Y directions in FIG. 14) and vertical direction (Z direction in FIG. 14), is arranged above the punch holder 44. A cam 49, as pressing means, is provided integrally with the rotary shaft 48. The cam 49 is positioned above the punches 45 and rotated together with the rotary shaft 48, thereby repeatedly striking and lowering the head portions of 46 of the punches 45.

In case of forming uneven portions 41 by means of the punches 34 shown in FIGS. 14 and 15, punch holder 44 is first placed above predetermined divisions 43 of the plate member 42 as the material of uneven portions. In this state, the cam 49 is positioned above a predetermined punch 45 and rotatably lowers the rotary shaft 48. As a result, the cam 49 strikes the head portion 46 of the punch 45 positioned below the cam 49 and pushes down the punch 45, thereby drawing the plate member 42. In this case, if the working quantity is within the formation limit, one uneven portion 41 is formed by one working operation of the punch 45. If working quantity exceeds the formation limit, then the cam 49 strikes the punch 45 a plurality of times and gradually lowers the punch holder 44, and a plurality of drawing operations are conducted to one uneven portion 41, thereby forming an uneven portion 41 having a desired depth.

The drawing of the punch 45 as stated above is conducted in units of divisions 43 one by one. Also, adjacent divisions 43 are simultaneously subjected to drawing. In that case, the order of working positions is set so as not to draw uneven portions 41 adjacent to one another with a boundary line put therebetween.

Figure 16:
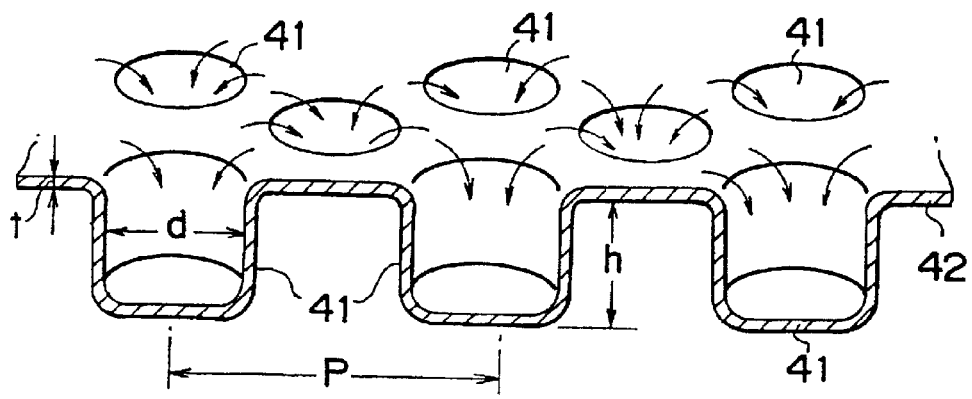
FIG. 16 is a partially cross-sectional view showing a multiple uneven plate having convex portions drawn in units of divisions.

Owing to this, as typically shown in FIG. 16, the respective uneven portions are formed while material is supplied thereto from their surrounding portions. In this case, uneven portions 41 are formed one by one in each division 43 and adjacent uneven portions 41 are not formed simultaneously. Thus, only the necessary quantity of material is introduced into the respective uneven portions 41. For that reason, it is possible to form uneven portions 41 each having an inner diameter (drawing diameter) d (such as about 1 mm) which is about twice or less as large as a pitch P and a depth h which is more than 1.5 times as large as the plate thickness t (such as 0.3 mm).

In the above-stated embodiments, description is given to a case of forming concave or convex portions each having a circular cross section if the flat plate member is cut in plane direction. The present invention is also applicable to a case of forming concave or convex portions each having a rectangular or polygonal cross section. In addition, the above description concerns a case of forming concave or convex portions each having a rectangular or cup-like cross section in the direction perpendicular to the plate member. The cross section of the concave or convex portions are not limited to the above shapes and can be formed into appropriate shapes as required. Moreover, in a case shown in FIGS. 14 and 15, means for pushing down the punch 45 is not limited to a cam and appropriate actuators such as an electromagnetic actuator or hydraulic means may be used as punch driving means. The multiple uneven plate manufactured by the present invention can be used for a separator in a solid electrolyte fuel cell stack.

Figure 17:
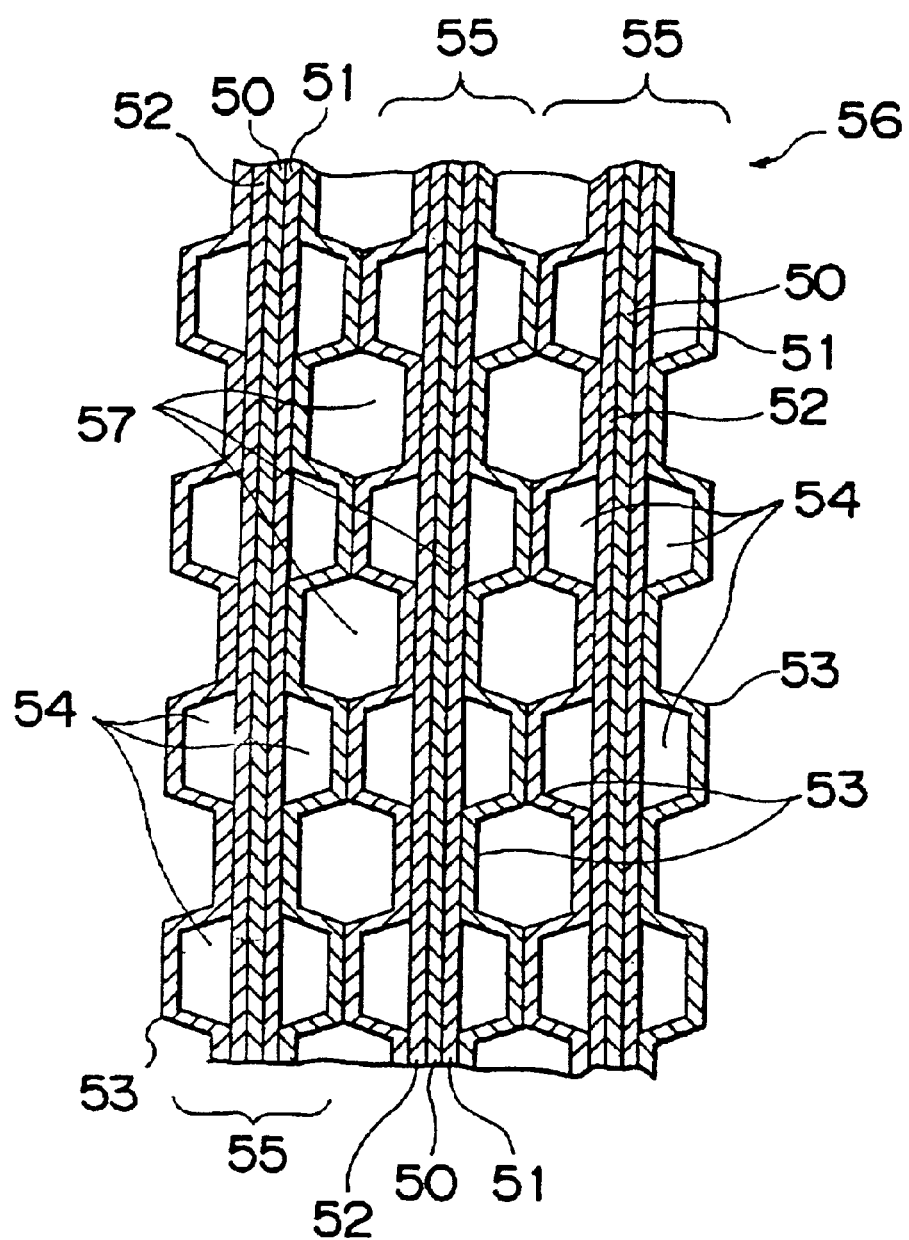
FIG. 17 is a typical and partial cross-sectional view showing a fuel cell stack using separators according to the present invention.

Next, description will be given to a case where the above-stated multiple-uneven plate is applied to a fuel cell separator. FIG. 17 is a typical cross-sectional view showing part of a high molecular electrolyte film type fuel cell stack. Electrodes 51 and 52, each containing a catalytic reaction quantity and a gas diffusion quantity, are provided to put an electrolyte film 50 which permeates ions such as protons, between them. The electrolyte film 50 consists of, for example, an ion exchange film having cation permeability in a wet condition. Each of the electrodes 51 and 52 consists of a catalytic layer for accelerating the electrolytic dissociation of fuel gas and reaction between ions generated by dissociation and oxidation gas (air) and a porous diffused layer diffusing gas through the catalytic layer. Separators 53 each consisting of a multiple uneven plate, are airtight arranged on the surfaces of the electrodes 51 and 52.

The separators 53 are made of conductive material (such as metal) and the peak surfaces of the convex portions or the bottoms of the concave portions are fixedly attached to the electrodes to maintain electrical continuity. Since the separators 53 are multiple uneven plates, many hollow portions spaced apart from the surfaces of the electrodes 51 and 52 are formed to communicate with one another and to have a certain distance from one another. The hollow portions serve as gas channels 54 through which fuel gas (such as hydrogen gas) and oxidation gas (such as air) flow.

A cell 55 is constituted by putting the stacked electrolytic film 50 and electrodes 51, 52 between a pair of separators 53. Many cells 55 are stacked in thickness direction to thereby constitute a fuel cell stack 56. With this structure, the concave portions or convex portions of the separators 53 of the cells 55 butt against those of the adjacent cells 55. Thus, deformations in directions adjacent to the butt portions but spaced apart from one another are generated and the spaced portions communicate with one another to thereby form cooling channels 57.

Figure 18:
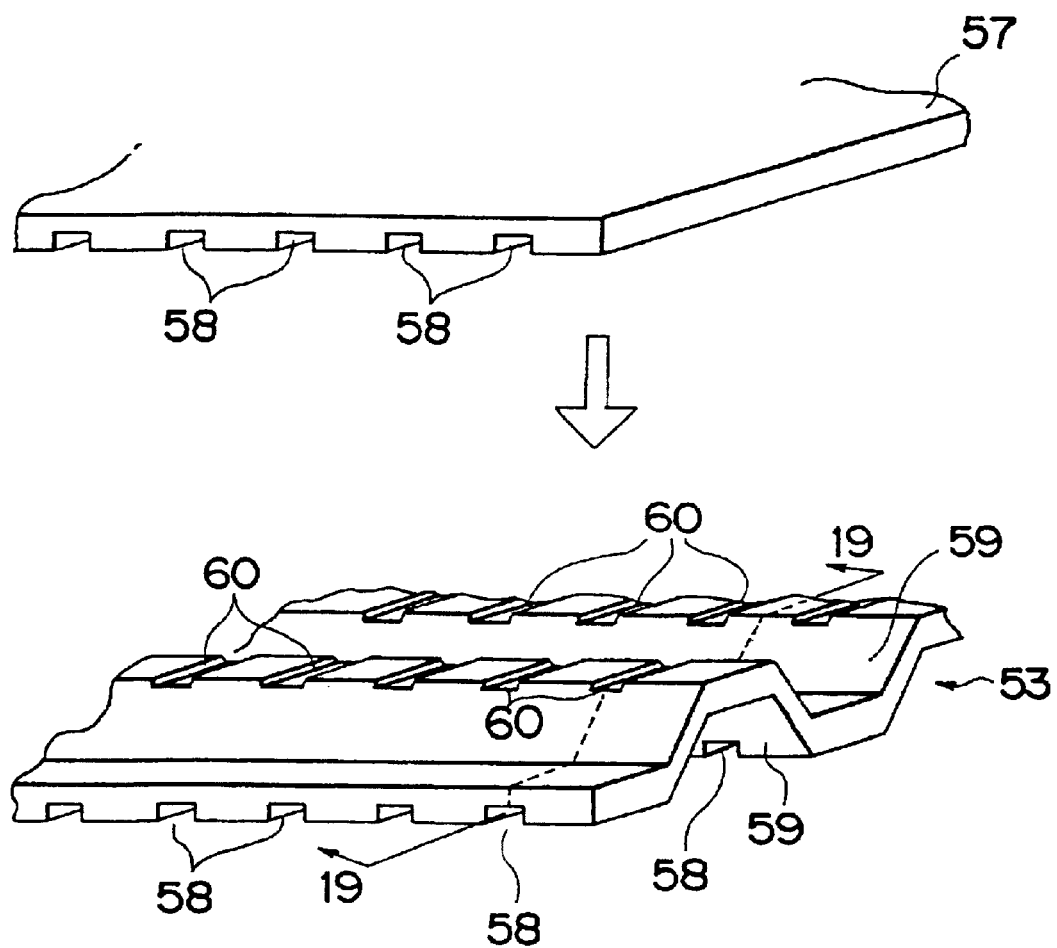
FIG. 18 is a partially perspective view showing a state before a plate member for a separator is wave-bent and a state in which shallow (or sink mark) grooves are formed by wave drawing.
Figure 19:
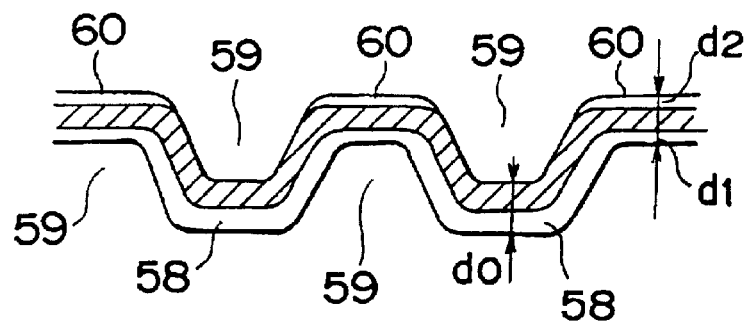
FIG. 19 is a partially enlarged view showing the sink mark grooves and a cross-sectional view of FIG. 18, taken along line 19—19 of FIG. 18.

These separators 53 are manufactured by both coining and wave bending among the multiple uneven plate manufacturing methods already stated above. Specifically, as shown in FIG. 18, sink marks are generated at the back surface side portion of the coining grooves 58 on one of the surfaces of the metal 57, and shallow grooves (to be temporarily referred to as 'sink mark' grooves hereinafter) 60 are generated. FIG. 19 is a cross-sectional view of FIG. 18, taken along line A—A of FIG. 18 and shows the cross section of the sink mark grooves 60. As shown in FIG. 19, the sum of the depth d2 of the sink mark groove 60 and the depth d1 of the coining groove 58 at the opposite side are substantially equal to the depth d0 of the coining groove 58 at a portion at which no "sink mark" is generated. Thus, the portions corresponding to crest lines on the surface are separated by the sink mark grooves 60 from one another to have a certain distance. As a result, many convex portions which are independent of one another are formed.

As shown in FIG. 19, the coining groove 58 has a depth which is about half the plate thickness of the metal plate 57. The wave bending groove 59, which is formed by bending the metal plate 57, has a depth far larger than that of the coining groove 58. Besides, since the sink mark grooves 60 are generated by sink marks as a result of wave bending, the depth of each groove 60 is far shallower than that of the coining groove 58. Thus, the wave bending grooves 59 at the surface side which is subjected to coining, communicate with each other by the coining groove 58 larger in cross-sectional area than the sink mark groove 60 and, therefore, the wave bending groove 59 and the coining groove 58 at the surface side which is subjected to coining, form a cooling water channel through which cooling water flows. The wave bending groove 59 and the sink mark groove at the side of the surface which is not subjected to coining, form a channel through which reaction gas such as fuel gas and oxidization gas flows.

The reaction gas is preferably formed to flow along the surfaces of the electrodes 51 and 52 as long as possible to improve reaction efficiency. To this end, the gas channel is formed such that reaction gas serpentines. One example is typically shown in FIG. 20. The coining groove is formed at the intermediate portion on the opposite surface which is not shown in FIG. 20, in the vertical direction of FIG. 20. The region in which coining grooves are formed is equally separated into four regions in the vertical direction of FIG. 20. In each region, crest lines and trough lines subjected to wave bending so that these lines are directed in the lateral direction of FIG. 20. As a result, the wave bending grooves 59 and sink mark grooves 60 are formed in direction orthogonal to one another on the gas channel side surface shown in FIG. 20 and adjacent wave bending grooves 59 are communicated with each other by the sink marked groove 60. In other words, gas channels crossing one another transversely and laterally are formed in the respective regions.

Figure 20:
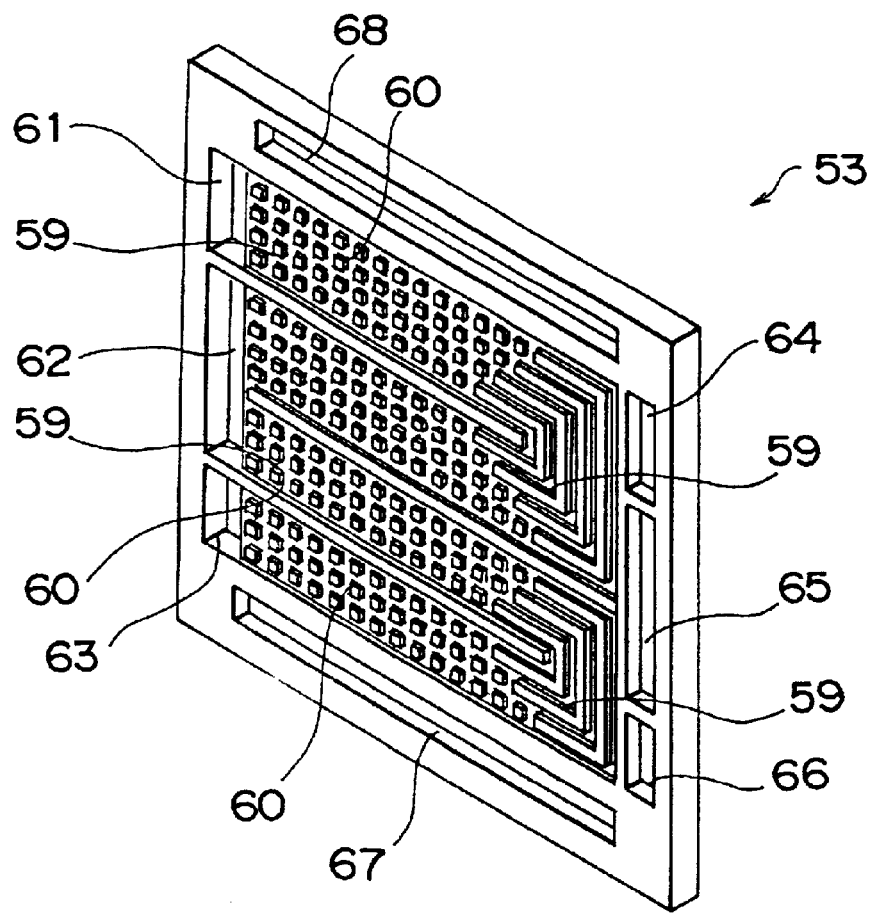
FIG. 20 is a perspective view of a separator according to the present invention.

At one end portion of the upper region shown in FIG. 20, an inlet manifold 61 communicating with all of the wave bending grooves 59 in the region is formed. Also, at one end portion of the two middle regions, an intermediate manifold 62 communicating with all of the wave bending grooves 59 in the regions is formed. Furthermore, at one end portion of the lower region, an outlet manifold 63 communicating with all of the wave bending grooves 59 in that region, is formed. These manifolds 61, 62 and 63 are long holes penetrating the separator 53 in the plate thickness direction. Channels for supplying or discharging reaction gas throughout the fuel cell stack are formed by stacking many cells.

Moreover, wave bending grooves 59 vertically curved are formed at the end portions opposite to the end portions provided with the manifolds 61 and 62 in the uppermost region and the second region from the top such that the wave bending grooves 59 in those regions communicate with one another. The same thing is true for the third region from the top and the lowest region. Reaction gas supplied from the inlet manifold 61, therefore, passes through the gas channels (i.e., wave bending grooves 59 and the sink mark grooves 60) in the uppermost region and reaches one end portion thereof, passes through the gas channels in the second region from the top through the wave bending grooves (so-called U-turn grooves) 59 along the vertical direction and reaches the intermediate manifold 62, and flows into the gas channels in the third region. Likewise, thereafter, the reaction gas enters the lowest region through the so-called U-turn groves formed along the vertical direction at one end portion opposite to the end portion provided with the manifolds 62 and 63 in the third region from the top and the lowest region, and it is finally-discharged from the outlet manifold 63.

In FIG. 20, through holes 64, 65, 66 are formed in positions horizontally symmetric to the manifolds 61, 62, 63, respectively, and stacked as elements of the fuel cell stack to thereby form channels for other reaction gas. In addition, an inlet manifold 67 for cooling water is formed in the lower part of FIG. 20 and an outlet manifold 68 for cooling water is formed in the upper part thereof. These manifolds 67 and 68, which are horizontally long holes, penetrate the separator 53 and communicate with a cooling water channel formed on the other surface not shown in FIG. 20.

Figure 21:
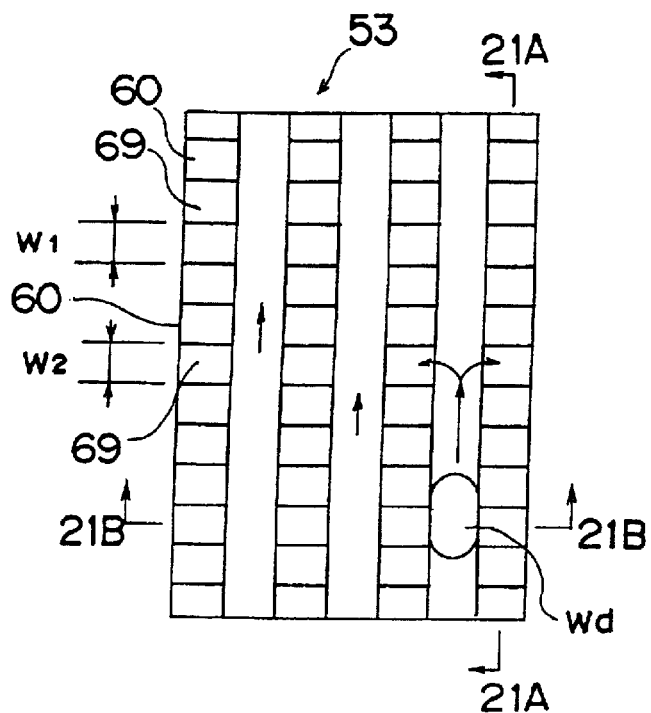
FIG. 21 is a partial plan view and a cross-sectional view showing droplet removal grooves in the separator according to the present invention.
Figure 21B:
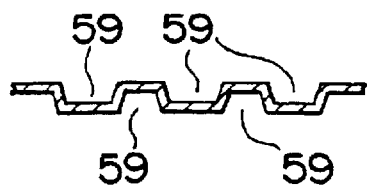
FIG. 21A and FIG. 21B are cross-sectional veiws taken along line 21A—21A of FIG. 21 and line 21B—21B of FIG. 21 respectively.
Figure 21A:
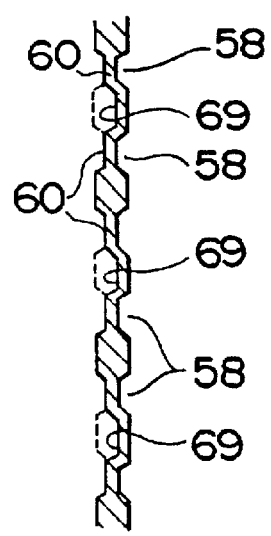

As stated above, a gas channel is formed by the wave bending groove 59 and the sink mark groove 60. The sink mark groove 60 is a shallow groove caused by "sink mark" accompanied by wave bending. The electrolysis film 50 is required to be kept in a wet condition so as to maintain cation permeability. The fuel cell using hydrogen gas as fuel gas generates water as a reaction product. For that reason, drop may sometimes flow into or is generated in the gas channels. The cross-sectional area of the opening of the sink mark grove 60 is relatively small compared with the drop. Due to this, there is a possibility that drop clogs the wave bending groove 59, the wave bending groove 59 does not effectively function as a gas channel until the drop is pushed out from the groove 59, thereby deteriorating the power generation efficiency of the fuel cell. To solve the disadvantage, the separator 53 is provided with a water drop removal groove 69. The water drop removal groove 69 will be described more specifically. FIG. 21 shows part of the gas channel side surface of the separator 53, the B—B cross-sectional view and C—C cross-sectional view. The wave bending grooves 59 are formed in the vertical direction of FIG. 21 and the sink mark grooves 60 are formed in positions corresponding to the coining grooves 58 on the back surface of the separator 53. The portions put between the sink mark grooves 60 are convex portions which contact with the electrodes. The portions corresponding to the convex portions are pressed and curved toward the back surface at predetermined intervals. The portions at the front surface side are depressed opposed to the convex portions, in which depressed portions the water drop removal grooves 69 are provided. Thus, the water drop removal grooves 69 are formed in positions on which back surface (the surface subjected to coining) the coining grooves 58 are not provided by bending. The arrangement is intended to avoid crashing the coining grooves 58. Due to this, the width W2 of each of the water drop removal grooves 69 is set to be smaller than the width W1 of the coining groove 58. In addition, the depth of the water drop removal groove 69 may be set to have a cross-sectional area through which water drop Wd can pass. The depth thereof may be set, for example, equal to the depth of the wave bending groove 59.

Hence, in the separator 53 provided with the above-stated water drop removal grooves 69, there is no fear that the gas channels are clogged by water drop and, even if clogging may happen, it is possible to quickly eliminate the clogging. This allows fuel gas or oxidation gas to efficiently distribute throughout the electrolyte film 50. It is, therefore, possible to improve the power generation efficiency of the fuel cell by using the above-described separator 53.

It is noted that the water drop removal groove 69 corresponds to the fourth groove according to the present invention. Also, the coining groove 58 corresponds to the first groove according to the present invention and the wave bending groove 59 on the surface, which is not subjected to coining, corresponds to the third groove.

Figure 22:
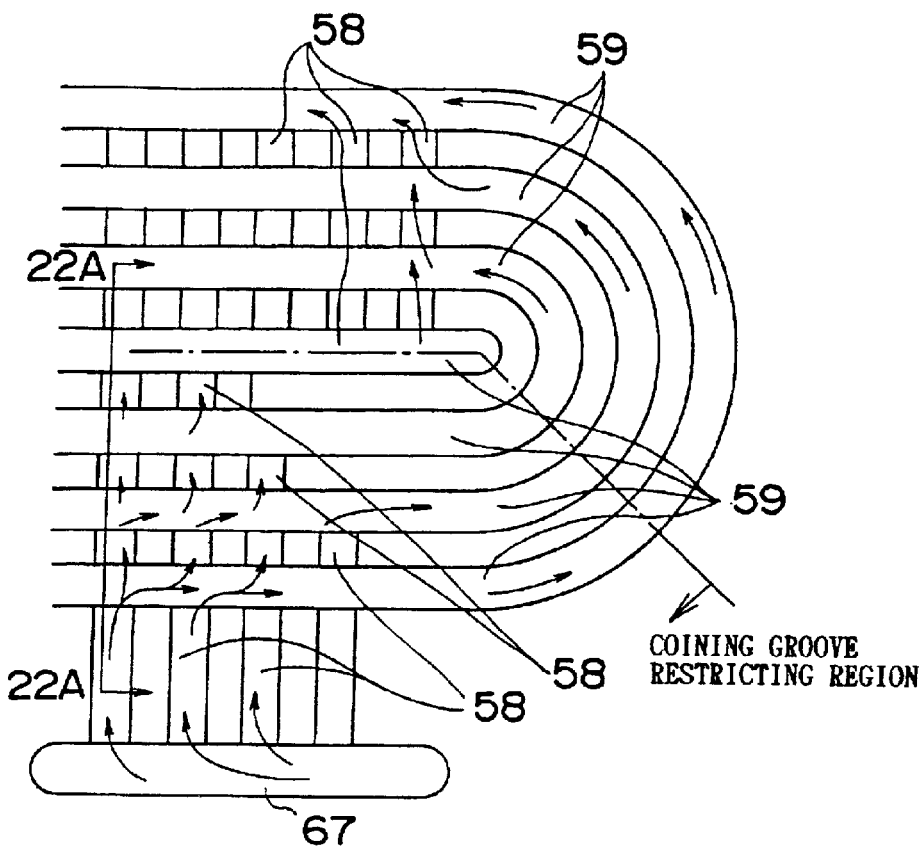
FIG. 22 is a partial plan view and a cross-sectional view showing part of a cooling water channel in the separator according to the present invention.
Figure 22A:
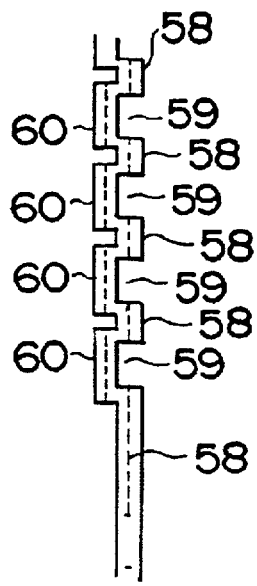
FIG. 22A is a cross-sectional view taken along line 22A—22A of FIG. 22.

The separator 53 is provided with the wave bending grooves 59 on the front and back surfaces by conducting wave bending. Due to this, the cooling water channel as well as the above-stated gas channel is divided into four regions. The wave bending grooves 59 in the upper two regions and the lower two regions communicate with one another by U-turn grooves at one end sides thereof. FIG. 22 shows typically part of the shape. As shown in FIG. 22, the respective wave bending grooves 59 which constitute a cooling water channel are supplied with cooling water through the coining grooves 58 formed in direction crossing the respective wave bending grooves 59. In this case, the coining groove 58 is shallower than the wave bending groove 59 and the opening area (channel area) is smaller than that of the wave bending groove 59. Owing to this, it is difficult for cooling water to flow from the wave bending grooves 59 to the coining grooves 58. In order to diffuse cooling water throughout the separator 53 as equally as possible and to cool the entire region equally, the cooling water channel is constituted as follows.

An inlet manifold 67 for cooling water is formed in the lower portion of the separator 53 so as to supply cooling water to the wave bending grooves 59 through the coining grooves 58. Due to this, cooling water is first supplied to the wave bending groove 59 closest to the inlet manifold 67 and flows along the wave bending groove 59. At this moment, part of the cooling water flows into another adjacent wave bending grooves 59 through the other coining groove 58 and moves into other wave bending grooves 59. Cooling water is supplied from the coining grooves 58 shallower than the wave bending grooves 59 to the wave bending grooves 59 far from the inlet manifold 67. The entire opening area of the coining groove 58 crossing the wave bending groove 59 closer to the inlet manifold 67 is set larger than that of the coining groove 58 crossing the wave bending groove 59 far from the inlet manifold 67.

Specifically, it is set so that the quantity of cooling water satisfies the following expressions:

$Vm=V1+V1-2$ $V1-2=V2+V2-3$ $V2-3=V3+V3-4$ and $(\frac{1}{2})n-1/Vm=V1.$

Vm is the quantity of cooling water at the inlet manifold 67, V1 is the quantity of cooling water at the coining groove 58 connecting the wave bending groove 59 closest to the inlet manifold 67 and the second wave bending groove 59 adjacent to the former. Likewise, V2 and V3 are quantities of cooling water at the second wave bending groove 59 and at the third wave bending groove 59. V2-3 is the quantity of cooling water at the coining groove 58 connecting the second and third wave bending grooves 59. V3-4 is the quantity of cooling water at the coining groove 58 connecting the third and fourth wave bending grooves 59. Symbol n is the number of wave bending grooves 59 and it is "4" in an example shown in FIG. 22.

In short, the quantity of cooling water of the coining groove 58 closer to the inlet manifold 67 is set larger. The setting is made by increasing the width or depth of a coining groove 58 to thereby increase the opening cross-sectional area thereof. Alternatively the setting made by increasing the number of the coining grooves 58 as they are closer to the inlet manifold 67. In the example shown in FIG. 22, the number of coining grooves 58 is increased at the inlet manifold 67 side.

It is necessary to accelerate the distribution of cooling water from the inlet manifold 67 into the wave bending grooves 59 so as to distribute cooling water throughout the separator 53 as equally as possible. To do so, the shape or array of the coining grooves 58 each having a smaller opening area that that of the wave bending grooves 59 is set as described above. In the midstream or downstream of the overall cooling water channel, cooling water is already distributed to respective wave bending grooves 59, so that there is no need to particularly design to distribute cooling water through the coining grooves 58. In the above-stated separator 53 according to the present invention, therefore, the shape and array of the coining grooves 58 to accelerate the distribution of cooling water are adopted at portions closer to the inlet manifold 67 in the overall cooling air channels. In the downstream side thereof, the shape and array of the coining grooves 58 are set to be the same between the wave bending grooves 59. That is, the shape and array of the coining grooves 58 corresponding to the first groove according to the present invention differ between the upstream side and the downstream side in the flow direction of the cooling water.

Among the wave bending grooves 59, the crossed angle between the wave bending grooves 59 and the coining grooves 58 continuously changes at the U-turn grooves and the direction of the wave bending grooves 59 and that of the coining grooves 58 coincide with one another at some portions. Thus, it is difficult to stably form the linear coining grooves 58 and the curved U-turn grooves. Considering this, in the example shown in FIG. 22, no coining groove 58 is formed at the U-turn grooves. The portions up to the intermediate portions of the U-turn grooves are used for the diffusion of cooling water. Due to this, the shape and array of the above-stated coining grooves 58 differ among the respective wave bending grooves 59. The divisions may be set at the intermediate portion of the U-turn grooves, more specifically, from the beginning of the U-turn grooves to the position rotated by about 45 of the beginning thereof.

What is claimed is:

1. A fuel cell separator comprising a multiple uneven plate, the multiple uneven plate having a plurality of first grooves formed on a first surface thereof, a thickness of the plate being smaller in each of the first grooves than a thickness of the plate outside the first grooves, the plate being bent to form a plurality of second grooves, the second grooves forming a corresponding plurality of trough and crest lines, the first grooves being formed in each of the trough and crest lines.

2. A fuel cell separator according to claim 1, wherein the first grooves and the second grooves formed on the first surface form cooling water channels, and wherein the second grooves formed on the second surface form gas channels.

3. A fuel cell separator according to claim 2, wherein cooling water flows along the first surface of the plate from an upstream side to a downstream side thereof and wherein upstream first grooves differ from downstream first groves in one array and shape.

4. A fuel cell separator according to claim 1, wherein the plate further comprises:
a plurality of third grooves formed on second surface by bending the plate in portions corresponding to the crest lines on the second surface of the plate member to cross the crest lines,
wherein the first grooves and second grooves on the first surface form cooling water channels, and the second grooves and third grooves on the second surface from gas channels.

5. A fuel cell separator according to claim 4, wherein the multiple uneven plate comprises:

a plurality of fourth grooves, each of the fourth grooves having a larger cross sectional area than a cross sectional area of the third grooves, the fourth grooves being formed on the second surface by pressure-deforming in a plate thickness direction predetermined portions of the plate corresponding to crest lines on the second surface of the plate member in a plate thickness direction.

* * * * *

UNITED STATES PATENT AND TRADEMARK OFFICE
CERTIFICATE OF CORRECTION

PATENT NO. : 6,833,214 B2
DATED : December 21, 2004
INVENTOR(S) : Jun Funatsu et al.

It is certified that error appears in the above-identified patent and that said Letters Patent is hereby corrected as shown below:

Column 16,
Line 56, change "groves" to -- grooves --.

Signed and Sealed this

Twenty-eighth Day of June, 2005

JON W. DUDAS
*Director of the United States Patent and Trademark Office*